Patented Sept. 24, 1935

2,015,067

UNITED STATES PATENT OFFICE 2,015,067

TEXTILE MATERIAL

Camille Dreyfus, New York, N. Y., and William Whitehead and Herbert E. Martin, Cumberland, Md., assignors to Celanese Corporation of America, a corporation of Delaware No Drawing. Application March 27, 1929, Serial No. 350,434

7 Claims. (Cl. 28—1)

This invention relates to the preparation of textile materials containing organic esters of cellulose, and relates more particularly to the preparation of yarns or fabrics containing organic esters of cellulose of comparatively low degree of esterification.

In the preparation of organic esters of cellulose, such as cellulose acetate, the cellulose is esterified with a suitable esterifying mixture containing the anhydride of the acid corresponding to the ester of cellulose desired, and this esterification is carried out to such a point that an ester of cellulose of comparatively high degree of esterification is formed. The esterifying mixture is then subjected to a process known as ripening wherein water or other hydrolizing agent is added to the same, and hydrolysis permitted to take place so that the acidyl value of the ester of cellulose is reduced to such a point that the ester of cellulose has the desired solubility characteristics in organic solvents. Thus in the formation of cellulose acetate, the acetylating mixture, after completion of the acetylation contains cellulose acetate approximately corresponding to the triacetate of cellulose, and water is added and the mixture permitted to stand at suitable temperatures until the cellulose acetate is hydrolized to such an extent that it is soluble in substantially pure acetone and has an acetyl value of say 53 to 56%. We have found that if this ripening or hydrolysis is permitted to proceed until the acetyl value of the cellulose acetate is reduced to say 40 to 50%, yarns and other textile materials having valuable properties may be formed therefrom.

In accordance with our invention we prepare filaments, yarns, bristles or artificial straw by dissolving an organic ester of cellulose of comparatively low degree of esterification in a suitable solvent and extruding such solution through orifices into an evaporative atmosphere or into a precipitating bath. Yarns formed in this manner have many valuable textile properties.

This invention is applicable to organic esters of cellulose broadly such as cellulose formate, cellulose acetate, cellulose propionate and cellulose butyrate. In the further description of this invention, the application thereof to cellulose acetate will be specifically described.

If cellulose acetate is to be employed, we prefer to use such cellulose acetate that has an acetyl value of 40 to 50%, preferably 45 to 48%. The acetyl value is determined as acetic acid by saponification. This cellulose acetate may be obtained by hydrolizing or ripening a cellulose acetate of higher acetyl value by addition of a suitable quantity of water, say from 25 to 75% of the weight of the cellulose employed, to the acetylating mixture after completion of the acetylation process. The mixture so formed is permitted to stand until the hydrolysis or ripening causes such loss of acetyl value to produce the cellulose acetate above described. In another form, a cellulose acetate of high acetyl value may be dissolved in suitable solvents and water and a small amount of sulfuric acid or other hydrolyzing agent added to this solution and the same permitted to hydrolize to the desired extent. If desired, the cellulose acetate of high acetyl value may be saponified by the addition of caustic alkali or other alkaline material to solutions of the same.

Cellulose diacetate, that is, cellulose acetate having 2 ester groups per molecule of cellulose has an acetyl value of substantially 48% while a cellulose acetate having an acetyl value of 40% contains 4/3 ester groups per molecule of cellulose.

The organic ester of cellulose of the low degree of esterification may be dissolved in any suitable solvents. Thus for the cellulose acetate above described, a mixture of acetone and water containing from 60 to 85 parts of acetone and from 40 to 15 parts of water may be employed. Generally, the lower the degree of esterification of the cellulose ester, the higher proportion of water in the solvent mixture will be employed. Other suitable volatile solvents such as mixtures of methylene chloride and alcohol, (ethyl or methyl) or mixtures of diethylene chloride or dichlorethylene and alcohol (ethyl or methyl) may be employed.

The solutions thus formed may be extruded through orifices of suitable size and shape depending on the nature of the material to be formed. Thus if yarn is to be formed the orifices will be of very small diameter, while if bristles or artificial horse-hair are to be formed the orifices will be correspondingly larger. If artificial straw is to be made, the orifices will be in the form of slits.

As stated the solutions of the esters of cellulose may be extruded through orifices into a drying evaporative atmosphere, if dry spinning is to be employed, or into a precipitating bath, if wet spinning is to be employed. In the making of yarns, the filaments formed may be associated together by twisting to form yarns, and this twisting may be either prior to winding, simultaneously therewith, or subsequent thereto.

Yarns when formed in accordance with our invention, have greater moisture regain, they are more pliable and therefore may be knitted more closely, the temperature at which fabrics made therefrom may be safely ironed is from 25 to 30° higher than the ordinary products, and they absorb dyes more rapidly.

In order further to illustrate our invention but without being limited thereto, the following specific example is given.

*Example*

A cellulose acetate, which has been formed by the hydrolysis of a cellulose acetate of a higher degree of acetylation is employed. This hydrolysis may be caused either by the addition to the acetylation mixture of a larger quantity of water than is normally employed or by permitting the hydrolysis to extend over a longer period of time or both. The cellulose acetate employed has preferably an acetyl value of 47.5% (determined as acetic acid.) 1 part of this cellulose acetate is dissolved in 3 parts of a solvent mixture consisting of 75 parts of acetone and 25 parts of water.

The solution thus formed is extruded through orifices of a spinneret into a heated evaporative atmosphere, such as air or other gas, and the filaments thus formed are associated by twisting into a yarn.

The yarn thus formed has an increased capacity for the absorption of moisture. Thus if such yarn is thoroughly dried and weighed and then exposed to air having normal humidity, the same regains about 7% of its weight to moisture as against 4.5% for the prior cellulose acetate yarns. This yarn has improved knitting property as is shown by the fact that a circular knitted fabric having 60 courses per inch and 32 wales may be made therefrom. A further desirable characteristic of the yarn is its increased safe ironing temperature. The yarns made in accordance with this example also absorb dyes more readily than the prior product.

The yarns formed by our invention may be formed into fabrics, whether woven, or circular knitted, or warp knitted, and also may be made into hosiery and garments of various natures.

It is to be understood that the foregoing detailed description is given merely by way of illustration and that many variations may be made therein without departing from the spirit of our invention.

Having described our invention, what we claim and desire to secure by Letters Patent is:

1. Textile material containing cellulose acetate of an acetyl value of substantially 40 to 48%.
2. Textile materials containing cellulose acetate of an acetyl value of substantially 45 to 48%.
3. Textile materials containing yarns of cellulose acetate of an acetyl value of substantially 40 to 48%, said yarns being capable of forming closely knitted fabric and having a high safe ironing point.
4. Textile materials containing yarns of cellulose acetate of an acetyl value of substantially 45 to 48%, said yarns being capable of forming closely knitted fabric and having a high safe ironing point.
5. Textile materials consisting of cellulose acetate having a substantially uniform acetyl value throughout, said acetyl value being between 40 and 48%.
6. Textile materials consisting of cellulose acetate having a substantially uniform acetyl value throughout, said acetyl value being between 45 and 48%.
7. Textile materials comprising yarns consisting of cellulose acetate having a substantially uniform acetyl value throughout, said acetyl value being between 40 and 48%, said yarns being capable of forming closely knitted fabric and having a high safe ironing point.

CAMILLE DREYFUS.
WILLIAM WHITEHEAD.
HERBERT E. MARTIN.